No. 866,357. PATENTED SEPT. 17, 1907.
W. HAMMANN.
FLASHING FASTENER.
APPLICATION FILED MAY 3, 1907.
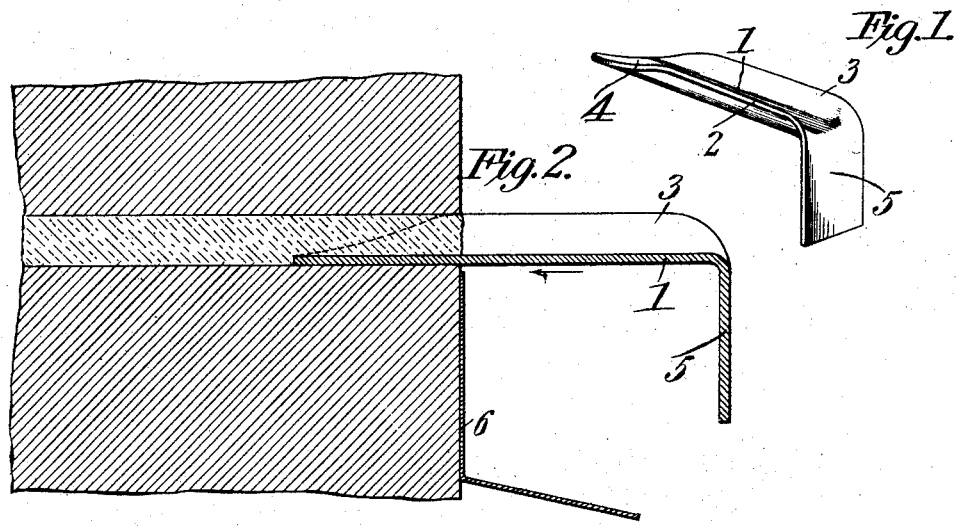
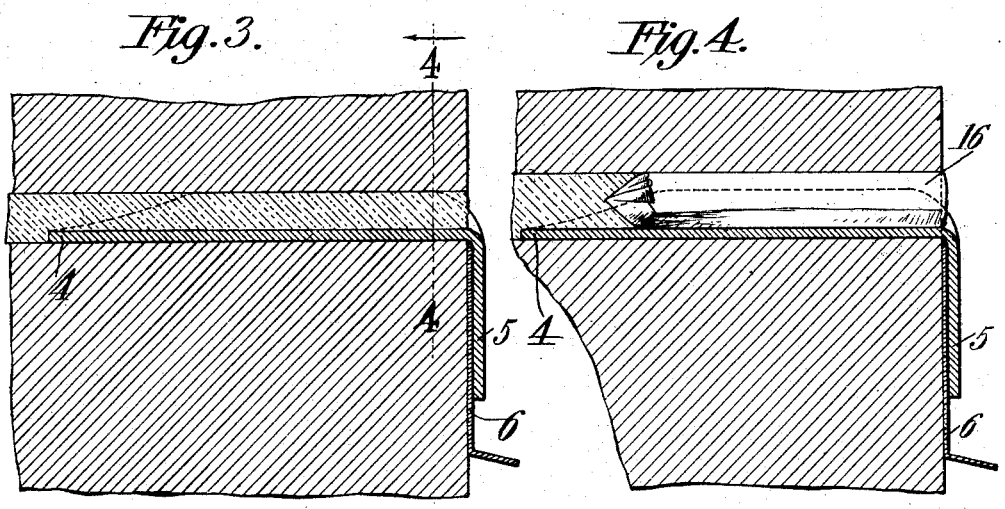
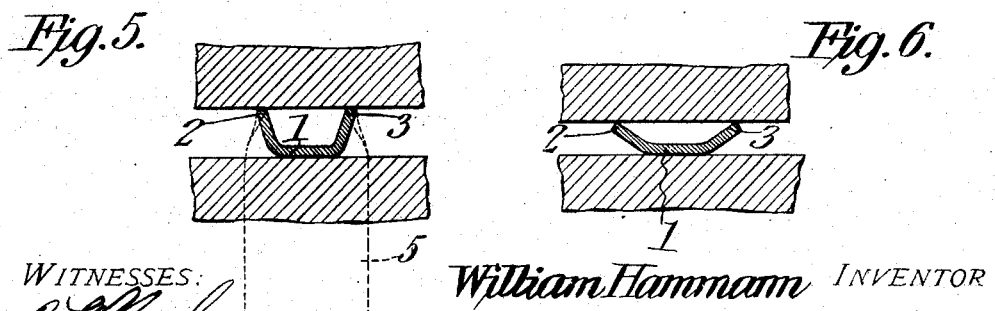
WITNESSES:
William Hammann INVENTOR
By C. A. Snow & Co.
ATTORNEYS

UNITED STATES PATENT OFFICE.

WILLIAM HAMMANN, OF MILWAUKEE, WISCONSIN.

FLASHING-FASTENER.

No. 866,357.　　　　Specification of Letters Patent.　　　　Patented Sept. 17, 1907.

Application filed May 3, 1907. Serial No. 371,652.

*To all whom it may concern:*

Be it known that I, WILLIAM HAMMANN, a citizen of the United States, residing at Milwaukee, in the county of Milwaukee and State of Wisconsin, have invented a new and useful Flashing-Fastener, of which the following is a specification.

This invention relates to improvements in devices that are adapted to be driven into a wall for securing various structures, and especially the flashings of roofs, and it has for its object to provide an improved device of this character that may be manufactured cheaply and is so constructed that it is capable of obtaining a secure hold in the mortar spaces between the bricks or stones of a wall, the devices being so constructed that they are capable of accommodating themselves to variations in the spaces between the bricks or stones, and they are not liable to lose their shape while being driven in place.

To these and other ends, the invention comprises the various novel features of construction and combination and arrangement of parts, which will be hereinafter more fully described and pointed out particularly in the claims appended hereto.

In the accompanying drawing:—Figure 1 is a perspective view of a flashing fastener constructed in accordance with the present invention. Fig. 2 is a diagrammatic view showing the mode of applying the fastener to a wall. Fig. 3 is a view similar to Fig. 2 showing the fastener driven into place. Fig. 4 illustrates a mode of applying the fastener to a relatively wide joint in the wall. Fig. 5 represents a cross section on the line 4—4 of Fig. 3. Fig. 6 is a view similar to Fig. 5 showing the fastener flattened and applied to a relatively narrow joint.

Corresponding parts in the several figures are indicated throughout by similar characters of reference.

The device shown in the present embodiment of my invention is especially adapted for use in securing the upper edges of grooves, gutters, and the like, to a wall or other similar structure, and it comprises, in the present instance, a channel-shaped shank 1 having its longitudinal edges turned upwardly to form a pair of substantially parallel flanges 2 and 3, the forward ends of these flanges being tapered or sloped to form a pointed end 4 that is capable of entering the mortar, cement, or other material filling the space between the two adjacent bricks or stones between which the device is to be inserted. The altitude of the upper edges of the flanges measured vertically above the intermediate or curved portion of the shank is preferably equivalent approximately to the average joint or space between the bricks or stones of a wall, so that when the device is driven into position, the upper edges of the flanges will engage the bottom of the brick or stone above it while the curved or intermediate portion will engage the upper surfaces of the brick or stone below it, a relatively firm hold being thereby provided.

The outer end of the shank is provided with an attaching or securing portion that is shaped according to the structure to be secured, the attaching portion, in the present instance, being composed of an arm 5 which is turned downwardly substantially at right angles to the axis of the shank, providing a portion to receive the hammer strokes while the device is being driven into place, and it obtains a firm hold over a relatively large area of the flashing 6 after it has been driven into place, the longitudinal edges of the attaching portion thus provided forming continuations of the longitudinal flanges of the shank the flanges thereby serving to reinforce the laterally turned attaching portion whereby bending of the latter relatively to the shank is prevented In applying the fastenings to walls wherein the joints or spaces between the courses of bricks are of an average size, the fastenings may be directly driven into place. However, when the joints are unusually narrow, the shank may be reduced on one of its transverse dimensions by flattening the flanges, that is to say, by bending them back until they stand at a less angle relatively to the intermediate portion, as shown in Fig. 6, and this will enable the device to be readily driven into place. Or, should the fastenings be composed of relatively light material, the sloping ends of the flanges will serve to automatically spread or flatten them in order that they may be applied to the joint as the device is driven into place.

In applying the fasteners to unusually wide joints, a plug 16 of wood or other suitable material may be driven into the joint between the shank of the fastener and the opposite brick, the upturned flanges providing a groove or receptacle between them for guiding and confining the plug or wedge.

The fastenings may be made in any desired way, it being preferable to form them into the desired shape from sheet stock of a suitable gage, the shape of the devices being such that they are capable of being formed by a simple operation in a press, and, when so constructed, they are not liable to become broken while being appplied.

What is claimed is:—

1. A device of the character described embodying a shank having its longitudinal edges turned up to form a pair of reversely inclined flanges, which diverge relatively as they proceed from the shank and a securing arm turned laterally toward that side of the shank opposite to the flanges.

2. A device of the character described embodying a shank having its longitudinal edges turned up to form a pair of reversely inclined lateral flanges which diverge relatively to one another toward their free edges, and a securing portion forming a continuation of the shank.

3. A device of the character described composed of sheet metal embodying a shank having its longitudinal edges turned up to form a pair of flanges having their forward ends shaped to form a tapered end or point, and an integral flat arm projecting laterally substantially at right angles to the axis of the shank and bent flatwise of the metal.

4. A device of the character described formed from a strip of sheet metal and embodying a shank portion having its longitudinal edges turned up to form a pair of lateral flanges their forward ends being shaped to form a pointed end, and a substantially flat arm turned downwardly substantially at right angles to the axis of the shank and in a direction flatwise of the metal, the longitudinal edges of the arm forming continuations of said flanges.

In testimony that I claim the foregoing as my own, I have hereto affixed my signature in the presence of two witnesses.

WILLIAM HAMMANN.

Witnesses:
CHAS. FRIEDRICH,
MARY KOEHLER.